US008756389B2

(12) United States Patent
Clayton et al.

(10) Patent No.: US 8,756,389 B2
(45) Date of Patent: *Jun. 17, 2014

(54) PREVENTION OF OVERLAY OF PRODUCTION DATA BY POINT IN TIME COPY OPERATIONS IN A HOST BASED ASYNCHRONOUS MIRRORING ENVIRONMENT

(71) Applicant: International Business Machines Corporation, Armonk, NY (US)

(72) Inventors: Nicolas M. Clayton, Warrington (GB); Lisa J. Gundy, Tucson, AZ (US); Clint A. Hardy, Tucson, AZ (US); Beth A. Peterson, Tucson, AZ (US); Alfred E. Sanchez, Tucson, AZ (US); David M. Shackelford, Tucson, AZ (US); Warren K. Stanley, Boulder, CO (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,041

(22) Filed: Feb. 22, 2013

(65) Prior Publication Data

US 2013/0166867 A1  Jun. 27, 2013

Related U.S. Application Data

(63) Continuation of application No. 13/075,542, filed on Mar. 30, 2011.

(51) Int. Cl.
*G06F 12/02* (2006.01)

(52) U.S. Cl.
USPC ........... 711/162; 711/112; 711/114; 711/154; 711/158; 711/161; 707/609; 707/640; 707/658

(58) Field of Classification Search
USPC ................. 711/112, 114, 154, 158, 161, 162; 707/609, 640, 658
See application file for complete search history.

(56) References Cited

U.S. PATENT DOCUMENTS 6,457,109 B1 * 9/2002 Milillo et al. ................. 711/162
6,484,187 B1 11/2002 Kern et al.
(Continued)

OTHER PUBLICATIONS

Office Action dated Mar. 28, 2013, pp. 17, for U.S. Appl. No. 13/075,542, filed Mar. 30, 2011, by inventors N.M. Clayton, et al., (18.381).

(Continued)

*Primary Examiner* — Arpan P. Savla
(74) *Attorney, Agent, or Firm* — Konrad Raynes Davda & Victor LLP; Rabindranath Dutta (57) ABSTRACT

A primary storage controller is configured to communicate with a secondary storage controller via a system data mover. In response to receiving a command to perform a point in time copy of a source volume of the primary storage controller to a target volume of the primary storage controller, a determination is made as to whether the target volume of the primary storage controller is a source for an asynchronous data replication operation, initiated by the system data mover, between the primary storage controller and the secondary storage controller. In response to determining that the target volume of the primary storage controller is the source for the asynchronous data replication operation, initiated by the system data mover, the point in time copy of the source volume of the primary storage controller to the target volume of the primary storage controller is performed.

15 Claims, 6 Drawing Sheets

(56) References Cited

U.S. PATENT DOCUMENTS

| | | | |
|---|---|---|---|
| 6,728,736 B2 | 4/2004 | Hostetter et al. | |
| 7,139,888 B2* | 11/2006 | Umemura | 711/162 |
| 7,254,683 B2 | 8/2007 | Burton et al. | |
| 7,415,593 B2* | 8/2008 | Mashima et al. | 711/203 |
| 7,467,234 B2* | 12/2008 | Ikegaya et al. | 709/248 |
| 7,613,785 B2 | 11/2009 | Chen et al. | |
| 7,627,729 B2* | 12/2009 | Bartfai et al. | 711/162 |
| 7,657,782 B2 | 2/2010 | Das et al. | |
| 8,001,351 B2* | 8/2011 | Liu et al. | 711/165 |
| 2005/0144404 A1* | 6/2005 | Nashimoto et al. | 711/154 |
| 2006/0015946 A1* | 1/2006 | Yagawa | 726/32 |
| 2006/0090048 A1* | 4/2006 | Okumoto et al. | 711/162 |
| 2006/0236048 A1* | 10/2006 | Deguchi et al. | 711/162 |
| 2008/0178041 A1* | 7/2008 | Takahashi et al. | 714/6 |
| 2009/0094252 A1 | 4/2009 | Wong et al. | |
| 2012/0254114 A1 | 10/2012 | Gundy et al. | |
| 2012/0254124 A1 | 10/2012 | Gundy et al. | |
| 2012/0254566 A1 | 10/2012 | Clayton et al. | |

OTHER PUBLICATIONS

Response dated Jun. 28, 2013, pp. 11, to Office Action dated Mar. 28, 2013, pp. 17, for U.S. Appl. No. 13/075,542, filed Mar. 30, 2011, by inventors N.M. Clayton, et al., (18.381).

Final Office Action dated Oct. 25, 2013, pp. 18, for U.S. Appl. No. 13/075,542, filed Mar. 30, 2011, by inventors N.M. Clayton, et al., (18.381).

Response dated Dec. 26, 2013, pp. 9, to Final Office Action dated Oct. 25, 2013, pp. 18, for U.S. Appl. No. 13/075,542, filed Mar. 30, 2011, by inventors N.M. Clayton, et al., (18.381).

Notice of Allowance dated Feb. 3, 2014. pp. 9, for U.S. Appl. No. 13/075,542 filed Mar. 30, 2011.

\* cited by examiner

PREVENTION OF OVERLAY OF PRODUCTION DATA BY POINT IN TIME COPY OPERATIONS IN A HOST BASED ASYNCHRONOUS MIRRORING ENVIRONMENT

CROSS-REFERENCE TO RELATED APPLICATIONS

This application is a continuation of application Ser. No. 13/075542 filed on Mar. 30, 2011, which is incorporated herein by reference in its entirety.

BACKGROUND

1. Field

The disclosure relates to a method, a system, and a computer program product for the prevention of overlay of production data by point in time copy operations in a host based asynchronous mirroring environment.

2. Background

In certain storage system environments mirroring of data may be performed asynchronously or synchronously. In synchronous mirroring of data, the system being replicated waits for the data to be recorded on the duplicate system before proceeding. In asynchronous mirroring of data, the system being replicated does not wait for the data to be recorded on the duplicate system before proceeding. The mirroring of data may aid in disaster recovery.

Asynchronous remote copy operations may be used to provide data replication over extended distances between two sites for business continuity and disaster recovery. Certain synchronous copy operations may be used to create, nearly instantaneously, point in time copies of entire logical volumes or data sets at the same site.

Certain storage system environments combine host applications with control unit logic to provide an asynchronous disaster recovery solution. The storage system environment may include a production site and a remote site that are separated by an extended distance that may in some situations exceed a kilometer, hundreds of kilometers, or even thousands of kilometers. Applications may execute the main production workloads at the production site, and backups may be stored in the remote sited for disaster recovery. The remote site may have a system data mover for moving data.

SUMMARY OF THE PREFERRED EMBODIMENTS

Provided are a method, a system, and a computer program product in which a primary storage controller is configured to communicate with a secondary storage controller via a system data mover. In response to receiving a command to perform a point in time copy of a source volume of the primary storage controller to a target volume of the primary storage controller, a determination is made as to whether the target volume of the primary storage controller is a source for an asynchronous data replication operation, initiated by the system data mover, between the primary storage controller and the secondary storage controller. In response to determining that the target volume of the primary storage controller is the source for the asynchronous data replication operation, initiated by the system data mover, the point in time copy of the source volume of the primary storage controller to the target volume of the primary storage controller is performed.

In additional embodiments, the command to perform the point in time copy has a target offline parameter that is configurable to indicate that the target volume is to be offline to host systems prior to initiating the point in time copy of the source volume of the primary storage controller to the target volume of the primary storage controller, wherein in response to determining that the target volume of the primary storage controller is the source for the asynchronous data replication operation, initiated by the system data mover, any configuration of the target offline parameter is ignored.

In yet additional embodiments, in response to determining that the target volume of the primary storage controller is in use by a host system that is not the system data mover, the performing of the point in time copy of the source volume of the primary storage controller to the target volume of the primary storage controller is avoided.

In further embodiments, information is stored in the primary storage controller indicating which of a plurality of hosts at a remote site is the system data mover that is allowed to access the target volume while the target volume is the target of the point in time operation, wherein the stored information is determined from an indication included in a set system characteristics command that is sent from the system data mover to the primary storage controller, wherein determining whether the target volume of the primary storage controller is the source for the asynchronous data replication operation is based on the stored information.

In certain embodiments, a determination is made of channel paths associated with the system data mover from path group information maintained for each session of the primary storage controller, wherein determining whether the target volume of the primary storage controller is the source volume for the asynchronous data replication operation is based on the determined channel paths.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow a point in time copy operation to be performed while an asynchronous data replication operation is in progress, by ignoring a target offline parameter of the point in time copy operation. As a result a source volume for an asynchronous data replication operation may be used as the target volume of the point in time copy operation while backup is being performed to a remote site.

Exemplary Embodiments

Figure 1:
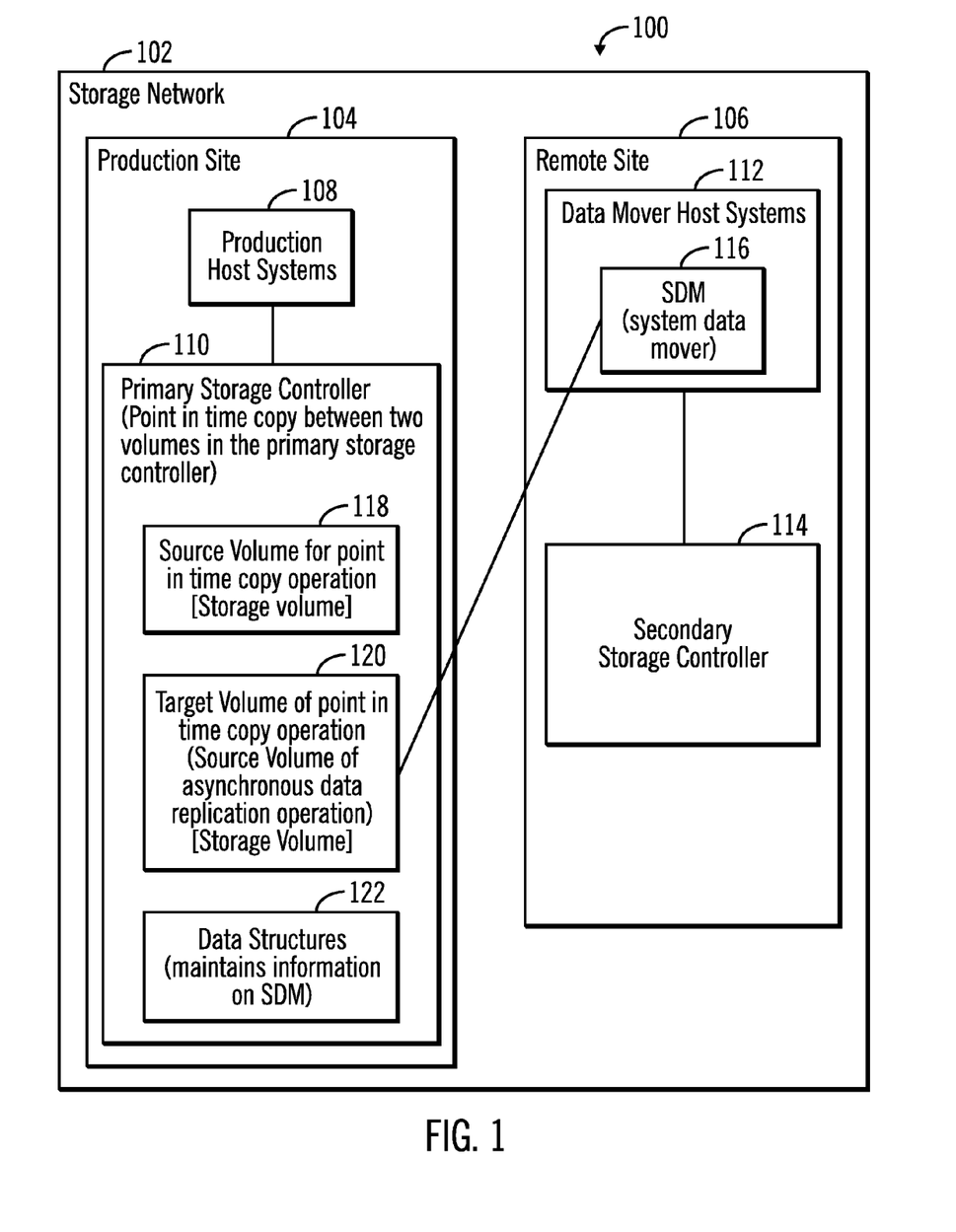
FIG. 1 illustrates a block diagram of a computing environment that includes a storage network that includes a production site and a remote site, in accordance with certain embodiments.

FIG. 1 illustrates a block diagram of a computing environment 100 that includes a storage network 102 having a production site 104 and a remote site 106. The production site 104 may include a plurality of production host systems 108 coupled to a primary storage controller 110, and the remote site 106 may include a plurality of data mover host systems 112 coupled to a secondary storage controller 114. The production host systems 108, the primary storage controller 110, the data mover host systems 112, and the secondary storage controller 114 may comprise any suitable computational device including those presently known in the art, such as, a personal computer, a workstation, a server, a mainframe, a hand held computer, a palm top computer, a telephony device, a network appliance, a blade computer, a server, a controller, etc.

The plurality of data mover host systems 112 may include a system data mover (SDM) 116, wherein the system date data mover is implemented in hardware, software, firmware or any combination thereof. The SDM 116 is in control of registering and terminating sessions with the primary storage controller 110. The SDM 116 is also in control of establishing and withdrawing volumes from such sessions on the primary storage controller 110. The volumes that belong to such sessions may be online to the SDM 116.

The primary storage controller 110 may control storage volumes 118, 120, wherein the storage volumes may also be referred to as volumes. In certain embodiments, a point in time copy operation may make a point in time copy of the storage volume 118 to the storage volume 120, i.e., the storage volume 118 may represent the source volume for the point in time copy operation and the storage volume 120 may represent the target volume for the point in time copy operation. Additionally, in certain embodiments the storage volume 120 may also be a source volume (also referred to as "source") for an asynchronous data replication operation that performs remote copy from the primary storage controller 110 to the secondary storage controller 114 via the SDM 116. Thus in certain embodiments, the storage volume 120 is expected to represent a target of a point in time operation and also represent a source of an asynchronous data replication operation. The primary storage controller 110 also includes data structures 122 that maintain information about the SDM 116. In certain embodiments, in addition to the storage volume 120, the storage volume 118 may also be a source volume for an asynchronous data replication operation that performs remote copy from the primary storage controller 110 to the secondary storage controller 114 via the SDM 116.

Figure 2:
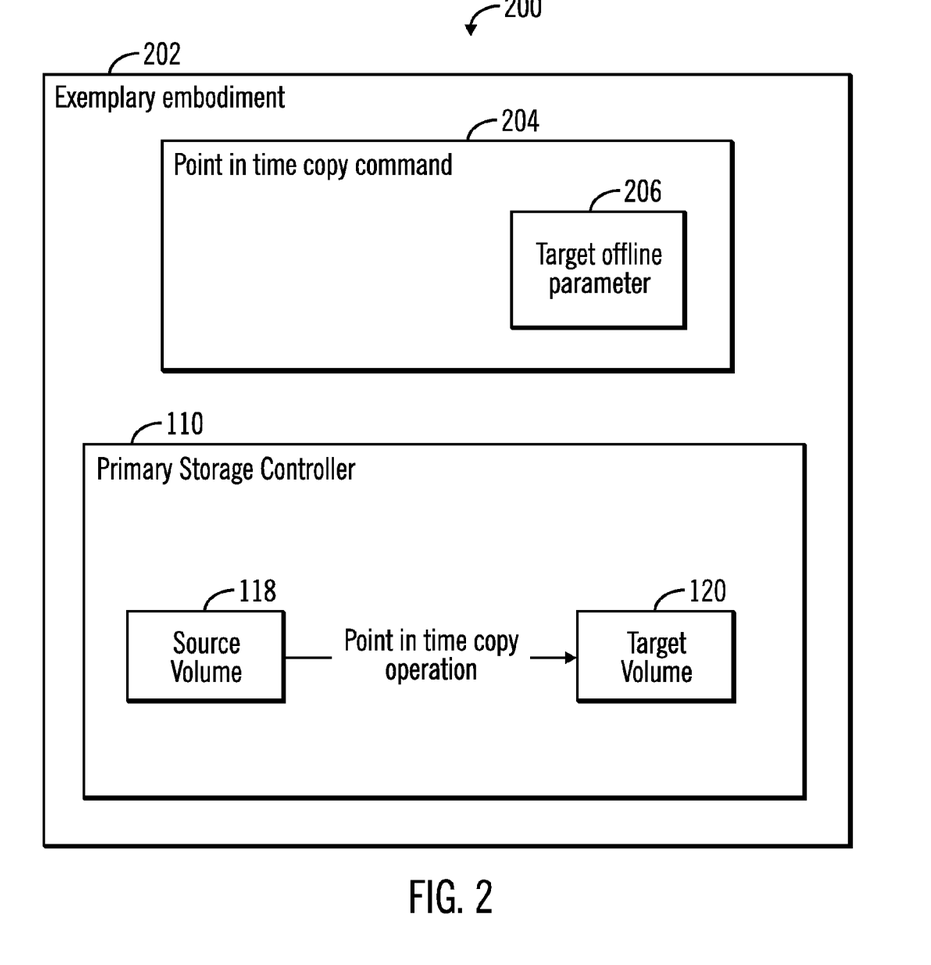
FIG. 2 illustrates a block diagram that shows a point in time copy operation that has a target offline parameter, in accordance with certain embodiments.

FIG. 2 illustrates a block diagram 200 that shows in an exemplary embodiment 202, a point in time copy operation 204 that has a target offline parameter 206, in accordance with certain embodiments. The target offline parameter 206 may provide an indication that the target volume 120 should be offline to host systems before the point in time command 204 can make a point in time copy of the source volume 118 to the target volume 120.

This storage network 102 may in certain situations cause an incompatibility between asynchronous data replication solutions and point in time copy solutions. If the target volume 120 is online, then this can prevent the target volume 120 from entering point in time relationships as the target volume. For example, in certain point in time copy solutions, the point in time copy command 204 may be rejected if the point in time target volume that is specified is online to any SDM. This option guards against the accidental use of the point in time copy command 204 to overwrite "active" data in the target volume 120.

However, if the target volume 120 of the point in time copy command 204 is being only used for backup via asynchronous data replication, the target volume 120 is only online to the SDM 116 and does not have any "active" data, wherein "active" data is data that should not be overwritten.

A potential mechanism may avoid configuring the target offline parameter 206 when creating a point in time relationship. This may nullify the safeguards provided by configuring the target offline parameter 206. Certain embodiments provide a mechanism to allow for the point in time relationship to be created when the target volume has been established as the source of an asynchronous data replication operation.

Figure 3:
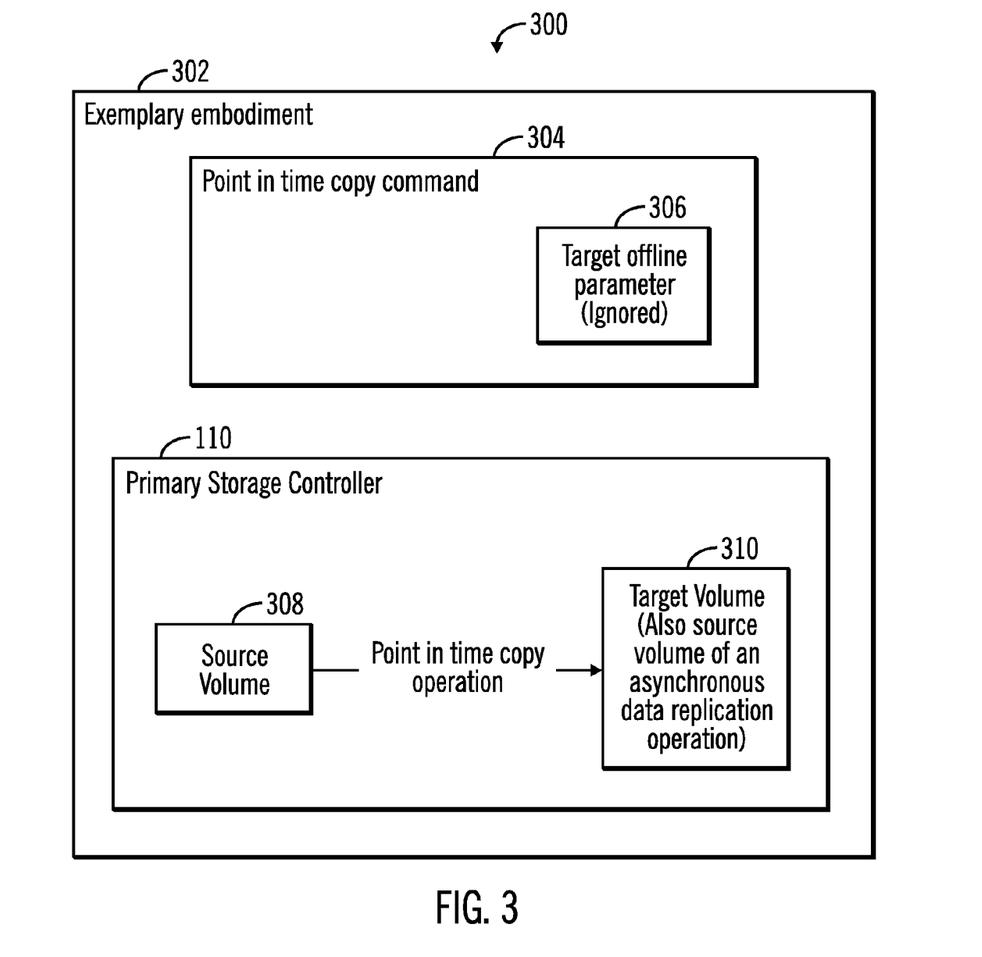
FIG. 3 illustrates a block diagram that shows a point in time copy operation for which the target offline parameter is ignored, in accordance with certain embodiments.

FIG. 3 illustrates a block diagram 302 that shows an exemplary embodiment 302 corresponding to a point in time copy command 304 for which the target offline parameter 306 is ignored, in accordance with certain embodiments.

In the exemplary embodiment 302 shown in FIG. 3, the point in time copy operation 304 has the target of parameter 306 configured. However, if it is determined that the target volume 310 is a source volume of an asynchronous data replication operation then the target offline parameter 306 is ignored and point in time copy operations perform a point in time copy of the source volume 308 to the target volume 310.

Therefore, FIG. 3 illustrates certain embodiments in which the target offline parameter 306 is ignored even when the target offline parameter 306 is configured in a point in time copy command 304.

Figure 4:
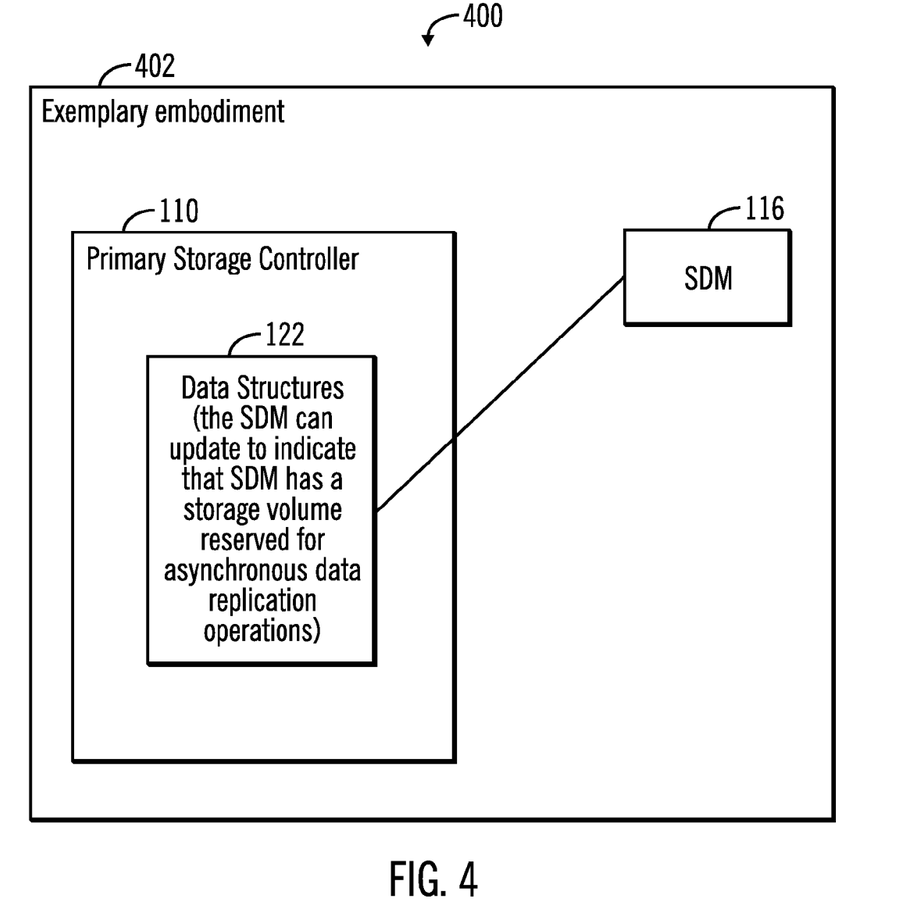
FIG. 4 illustrates an exemplary embodiment in which data structures maintained in the primary storage controller store information related to a system data mover, in accordance with certain embodiments.

FIG. 4 illustrates an exemplary embodiment 402 in which data structures 122 maintained in the primary storage controller 110 stores information related to the SDM 116, in accordance with certain embodiments. In certain embodiments, the SDM 116 is capable of updating the data structures 122 to indicate that SDM 116 has a storage volume reserved for asynchronous data replication operations. This storage volume that is reserved is not "active" and can be overwritten. Once this information is stored in the data structures 122, the data structures 122 may be processed to determine that since the SDM 116 is using the reserved storage volume for asynchronous data replication operations, the storage volume may also serve as the target of a point in time copy operation and the target offline parameter 306 may be ignored.

Figure 5:
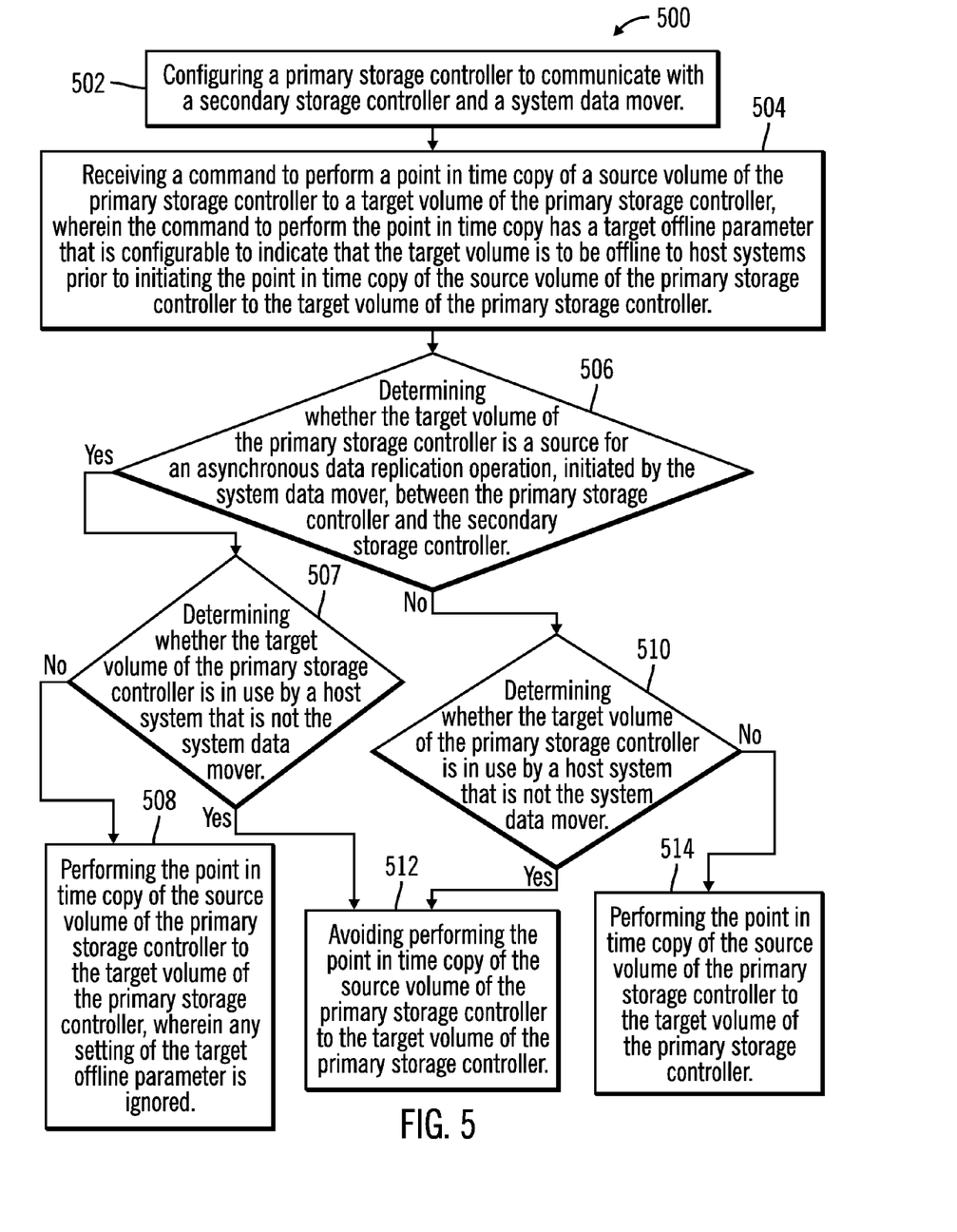
FIG. 5 illustrates a flowchart that shows certain operations, in accordance with certain embodiments.

FIG. 5 illustrates a flowchart 500 that shows certain operations, in accordance with certain embodiments. The operations shown in the flowchart 500 may be performed at the primary storage controller 110.

Control starts at block 502, in which the primary storage controller 110 is configured to communicate with a secondary storage controller 114 via a system data mover 116. The primary storage controller 110 receives (at block 504) a command 304 to perform a point in time copy of a source volume 118 of the primary storage controller 110 to a target volume 120 of the primary storage controller 110, wherein the command 304 to perform the point in time copy has a target offline parameter 306 that configurable to indicate that the target volume 120 is to be offline prior to initiating the point in time copy of the source volume 118 of the primary storage controller 110 to the target volume 118 of the primary storage controller 110.

Control proceeds to block 506 in which a determination is made as to whether the target volume 120 of the primary storage controller 110 is a source for an asynchronous data replication operation, initiated by the system data mover 116, between the primary storage controller 110 and the secondary storage controller 114. If at block 506, a determination is made that the target volume 120 of the primary storage controller 110 is a source for an asynchronous data replication operation, initiated by the system data mover 116, between the primary storage controller 110 and the secondary storage controller 114, then control proceeds to block 507 in which a determination is made as to whether the target volume 120 of the primary storage controller 110 is in use by a host system that is not the system data mover 116.

If at block 507, it is determined that the target volume 120 of the primary storage controller 110 is not in use by a host system that is not the system data mover 116, then a point in time copy of the source volume of the primary storage controller to the target volume of the primary storage controller is performed (at block 508), wherein any setting of the target offline parameter 310 is ignored. If at block 507, it is determined that the target volume 120 of the primary storage controller 110 is in use by a host system that is not the system data mover 116, control proceeds to block 512, in which the performing of the point in time copy of the source volume of the primary storage controller to the target volume of the primary storage controller is avoided as the target volume 120 may be "active" and as a result should not be overwritten.

If at block 506, a determination is made that the target volume 120 of the primary storage controller 110 is not a source for an asynchronous data replication operation, initiated by the system data mover 116, between the primary storage controller 110 and the secondary storage controller 114, then control proceeds to block 510, in which a determination is made as to whether the target volume 120 of the primary storage controller 110 is in use by a host system that is not the system data mover 116.

If at block 510, a determination is made that the target volume 120 of the primary storage controller 110 is in use by a host system that is not the system data mover 116, then the performing of the point in time copy of the source volume 118 of the primary storage controller 110 to the target volume 120 of the primary storage controller 110 is avoided (at block 512) as the target volume 120 may be "active" and as a result should not be overwritten.

If at block 510, a determination is made that the target volume 120 of the primary storage controller 110 is not in use by a host system that is not the system data mover 116, then the point in time copy of the source volume 118 of the primary storage controller 110 to the target volume 120 of the primary storage controller 110 is performed.

As a result of the operations shown in FIG. 5, the overlay of production data by point in time copy operations in a host based asynchronous mirroring environment is avoided when the other hosts besides the SDM 116 are using storage volumes that are the target of the point in time copy operations. However, when the SDM 116 uses storage volumes as a source for remote backup via asynchronous replication operation, and other hosts besides the SDM 116 are not using the storage volumes that are the target of the point in time copy operations, then the target offline parameter 306 is ignored and both asynchronous data replication and point in time copy can be performed at the same time.

In certain embodiments, a new indication can be added to a set system characteristics (SSC) command that is sent from SDM 116 at the remote site 106 to the primary storage controller 116. The indicator may then notify the primary storage controller 110 to consider the information that the path group the SSC command was received on was from a remote SDM. This means that the target online checking is to be ignored for any device online to only the SDM.

In certain other embodiments, control unit logic may be added to determine the channel paths associated with the SDM from the path group information already kept for each storage controller session. As a result, the target online checking is ignored for any device that is online to only the SDM host.

Certain embodiments may be implemented in the context of IBM* XRC mirroring solutions in combination with IBM* FlashCopy* (FC) Point in Time (PiT) function.

*IBM, FlashCopy are trademarks or registered trademarks of International Business Machines Corporation.

In a first embodiment, a parameter library (PARMLIB) option is provided to allow the user to indicate whether or not a given host system is a SDM system. When the PARMLIB option is set indicating that the system is a SDM system, the host sets the new indicator in the SSC command. The SSC command is received by the primary storage controller. The primary storage controller then parses the command and finds the new indicator. The Pathing component is then aware that the channel path that the SSC command was received on is associated with the XRC SDM. This knowledge is stored in an internal control block, such as the data structures 122. Later when a FlashCopy command is received with the target offline parameter specified, a check can be made to see if the device was online to any other host other than the SDM. If the device is only online to the SDM host, the FlashCopy command will be accepted.

A second embodiment does not need any additional information from the SDM. The primary storage controller 110 already has all the information needed. Volumes can only be established into one XRC Storage Controller session. When the session is registered, the Path Group the command was received on is saved in the XRC Storage Controller session. The Path Group information is saved for the lifetime of the session and persists through session suspensions. Later when a FlashCopy command is received with the target offline parameter, Copy Services can call Pathing with the Path Group information saved in the session. Pathing will verify that the target volume is not online to any other host other than the SDM by masking out the Path Group information received from Copy Services.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc, or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
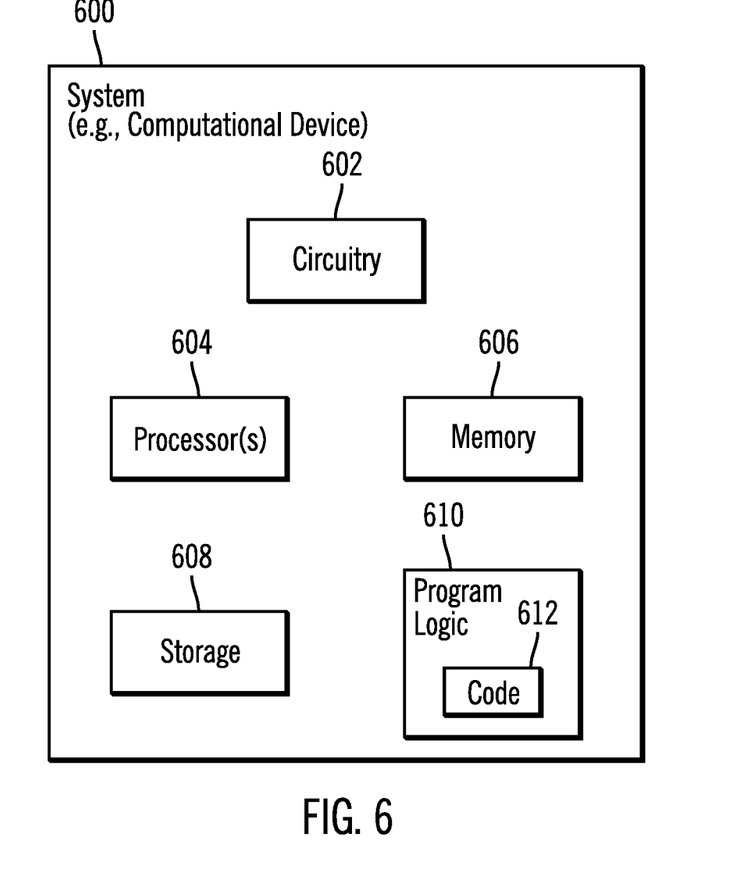
FIG. 6 illustrates a block diagram of a computational system that shows certain elements that may be included in the computing environment of FIG. 1, in accordance with certain embodiments.

FIG. 6 illustrates a block diagram that shows certain elements that may be included in the system 600 in accordance with certain embodiments. The system 600 may comprise the primary storage controller 110, the production host systems 108, the data mover host systems 112, the secondary storage controller 114, the SDM 116, and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
configuring a primary storage controller to communicate with a secondary storage controller via a system data mover;
in response to receiving a command to perform a point in time copy of a source volume of the primary storage controller to a target volume of the primary storage controller, determining whether the target volume of the primary storage controller is a source for an asynchronous data replication operation, initiated by the system data mover, between the primary storage controller and the secondary storage controller; and
in response to determining that the target volume of the primary storage controller is the source for the asynchronous data replication operation, initiated by the system data mover, performing the point in time copy of the source volume of the primary storage controller to the target volume of the primary storage controller, wherein the command to perform the point in time copy has a parameter that is configurable to indicate that the target volume is to be offline to host systems prior to initiating the point in time copy of the source volume of the primary storage controller to the target volume of the primary storage controller, wherein in response to determining that the target volume of the primary storage controller is the source for the asynchronous data replication operation, initiated by the system data mover, and that the tar volume of the primary storage controller is not in use by a host system that is not the system data mover, any configuration of the parameter is ignored.

2. The method of claim 1, the method further comprising:
in response to determining that the target volume of the primary storage controller is in use by a host system that is not the system data mover, avoiding performing the point in time copy of the source volume of the primary storage controller to the target volume of the primary storage controller.

3. The method of claim 1, further comprising:
storing information in the primary storage controller indicating which of a plurality of hosts at a remote site is the system data mover that is allowed to access the target volume while the target volume is the target of the point in time operation, wherein the stored information is determined from an indication included in a set system characteristics command that is sent from the system data mover to the primary storage controller, wherein determining whether the target volume of the primary storage controller is the source for the asynchronous data replication operation is based on the stored information.

4. The method of claim 1, further comprising:
determining channel paths associated with the system data mover from path group information maintained for each session of the primary storage controller, wherein determining whether the target volume of the primary storage controller is the source volume for the asynchronous data replication operation is based on the determined channel paths.

5. The method of claim 1, wherein the parameter is a target offline parameter.

6. A method for deploying computing infrastructure, comprising integrating computer-readable code into a computational system, wherein the code in combination with the computational system performs operations, the operations comprising:
configuring a primary storage controller to communicate with a secondary storage controller via a system data mover;
in response to receiving a command to perform a point in time copy of a source volume of the primary storage controller to a target volume of the primary storage controller, determining whether the target volume of the primary storage controller is a source for an asynchronous data replication operation, initiated by the system data mover, between the primary storage controller and the secondary storage controller; and
in response to determining that the target volume of the primary storage controller is the source for the asynchronous data replication operation, initiated by the system data mover, performing the point in time copy of the source volume of the primary storage controller to the target volume of the primary storage controller, wherein the command to perform the point in time copy has a parameter that is configurable to indicate that the target volume is to be offline to host systems prior to initiating the point in time copy of the source volume of the primary storage controller to the target volume of the primary storage controller, wherein in response to determining that the target volume of the primary storage controller is the source for the asynchronous data replication operation, initiated by the system data mover and that the target volume of the primary storage controller is not in use by a host system that is not the system data mover any configuration of the parameter is ignored.

7. The method for deploying computing infrastructure of claim 6, the operations further comprising:
in response to determining that the target volume of the primary storage controller is in use by a host system that is not the system data mover, avoiding performing the point in time copy of the source volume of the primary storage controller to the target volume of the primary storage controller.

8. The method for deploying computing infrastructure of claim 6, the operations further comprising:
storing information in the primary storage controller indicating which of a plurality of hosts at a remote site is the system data mover that is allowed to access the target volume while the target volume is the target of the point in time operation, wherein the stored information is determined from an indication included in a set system characteristics command that is sent from the system data mover to the primary storage controller, wherein determining whether the target volume of the primary storage controller is the source for the asynchronous data replication operation is based on the stored information.

9. The method for deploying computing infrastructure of claim 6, the operations further comprising:
determining channel paths associated with the system data mover from path group information maintained for each session of the primary storage controller, wherein determining whether the target volume of the primary storage controller is the source volume for the asynchronous data replication operation is based on the determined channel paths.

10. The method for deploying computing infrastructure of claim 6, wherein the parameter is a target offline parameter.

11. A method, comprising:
in response to receiving a command to perform a point in time copy of a source volume of a primary storage controller to a target volume of the primary storage controller, and in response to determining that the target volume of the primary storage controller is a source for an asynchronous data replication operation between the primary storage controller and a secondary storage controller, performing the point in time copy of the source volume of the primary storage controller to the target volume of the primary storage controller, wherein the command to perform the point in time copy has a parameter that is configurable to indicate that the target volume is to be offline to host systems prior to initiating the point in time copy of the source volume of the primary storage controller to the target volume of the primary storage controller, wherein in response to determining that the target volume of the primary storage controller is the source for the asynchronous data replication operation, and that the target volume of the primary storage controller is not in use by a host system that is not a system data mover, any configuration of the parameter is ignored.

12. The method of claim 11, wherein the parameter is a target offline parameter.

13. The method of claim 11, the method further comprising:
in response to determining that the target volume of the primary storage controller is in use by a host system that is not a system data mover, avoiding performing the point in time copy of the source volume of the primary storage controller to the target volume of the primary storage controller.

14. The method of claim 11, the method further comprising:
storing information in the primary storage controller indicating which of a plurality of hosts at a remote site is a system data mover that is allowed to access the target volume while the target volume is the target of the point in time operation, wherein the stored information is determined from an indication included in a set system characteristics command that is sent from the system data mover to the primary storage controller, wherein determining whether the target volume of the primary storage controller is the source for the asynchronous data replication operation is based on the stored information.

15. The method of claim 11, the method further comprising:
determining channel paths associated with a system data mover from path group information maintained for each session of the primary storage controller, wherein determining whether the target volume of the primary storage controller is the source volume for the asynchronous data replication operation is based on the determined channel paths.

* * * * *